US012757176B2

(12) United States Patent
Ji et al.

(10) Patent No.: US 12,757,176 B2
(45) Date of Patent: Oct. 6, 2026

(54) L-BAND FREQUENCY DOMAIN RESOURCE ALLOCATION

(71) Applicant: QUALCOMM Incorporated, San Diego, CA (US)

(72) Inventors: Lianghai Ji, San Diego, CA (US); Jun Ma, San Diego, CA (US); Liangping Ma, San Diego, CA (US); Alexander Dorosenco, El Cajon, CA (US); Qiang Wu, San Diego, CA (US); Mohamad Sayed Hassan, Paris (FR)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 18/299,367

(22) Filed: Apr. 12, 2023

(65) Prior Publication Data

US 2024/0349262 A1 Oct. 17, 2024

(51) Int. Cl.
*H04W 72/0453* (2023.01)
*G01S 19/21* (2010.01)
*H04W 72/541* (2023.01)

(52) U.S. Cl.
CPC ......... *H04W 72/0453* (2013.01); *G01S 19/21* (2013.01); *H04W 72/541* (2023.01)

(58) Field of Classification Search
CPC ...... H04W 72/0453; H04W 72/043541; G01S 19/21
See application file for complete search history.

(56) References Cited

U.S. PATENT DOCUMENTS

| | | | | |
|---|---|---|---|---|
| 2011/0210889 | A1* | 9/2011 | Dai | G01S 19/235 342/357.29 |
| 2011/0279339 | A1* | 11/2011 | Johnston | H01Q 13/02 343/786 |
| 2015/0256314 | A1 | 9/2015 | Gauvreau et al. | |
| 2016/0234748 | A1 | 8/2016 | Chrisikos et al. | |
| 2016/0302209 | A1 | 10/2016 | Behravan et al. | |
| 2020/0251816 | A1* | 8/2020 | Lee | H01Q 1/48 |
| 2022/0344823 | A1* | 10/2022 | Panther | H01Q 25/001 |
| 2022/0345205 | A1* | 10/2022 | Ioffe | H04W 72/0453 |
| 2024/0146399 | A1* | 5/2024 | Bhattarai | H04B 7/18521 |
| 2024/0313818 | A1* | 9/2024 | Zhao | G01S 19/37 |

OTHER PUBLICATIONS

International Search Report and Written Opinion—PCT/US2024/019658—ISA/EPO—Jun. 7, 2024.

* cited by examiner

*Primary Examiner* — Kent Krueger
(74) *Attorney, Agent, or Firm* — Harrity & Harrity LLP

(57) ABSTRACT

Various aspects of the present disclosure generally relate to wireless communication. In some aspects, a user equipment (UE) may transmit information associated with one or more uplink transmissions performed by the UE within an L-band. The UE may receive, after transmitting the information, an adjusted frequency domain resource allocation that indicates an adjusted frequency range to be used by the UE for performing one or more other uplink transmissions. Numerous other aspects are described.

30 Claims, 11 Drawing Sheets

L-BAND FREQUENCY DOMAIN RESOURCE ALLOCATION

FIELD OF THE DISCLOSURE

Aspects of the present disclosure generally relate to wireless communication and to techniques and apparatuses for L-band frequency domain resource allocation.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes transmitting information associated with one or more uplink transmissions performed by the UE within an L-band; and receiving, after transmitting the information, an adjusted frequency domain resource allocation that indicates an adjusted frequency range to be used by the UE for performing one or more other uplink transmissions.

Another aspect provides a method for wireless communication by a network node. The method includes receiving information associated with one or more uplink transmissions by a UE performed within an L-band; and transmitting, after receiving the information, an adjusted frequency domain resource allocation that indicates an adjusted frequency range to be used by the UE for performing one or more other uplink transmissions.

Other aspects provide: an apparatus operable, configured, or otherwise adapted to perform any one or more of the aforementioned methods and/or those described herein with reference to and as illustrated by the drawings and specification; a non-transitory, computer-readable medium comprising computer-executable instructions that, when executed by a processor of an apparatus, cause the apparatus to perform the aforementioned methods and/or those described herein with reference to and as illustrated by the drawings and specification; a computer program product embodied on a computer-readable storage medium comprising code for performing the aforementioned methods and/or those described herein with reference to and as illustrated by the drawings and specification; and/or an apparatus comprising means for performing the aforementioned methods and/or those described herein with reference to and as illustrated by the drawings and specification. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
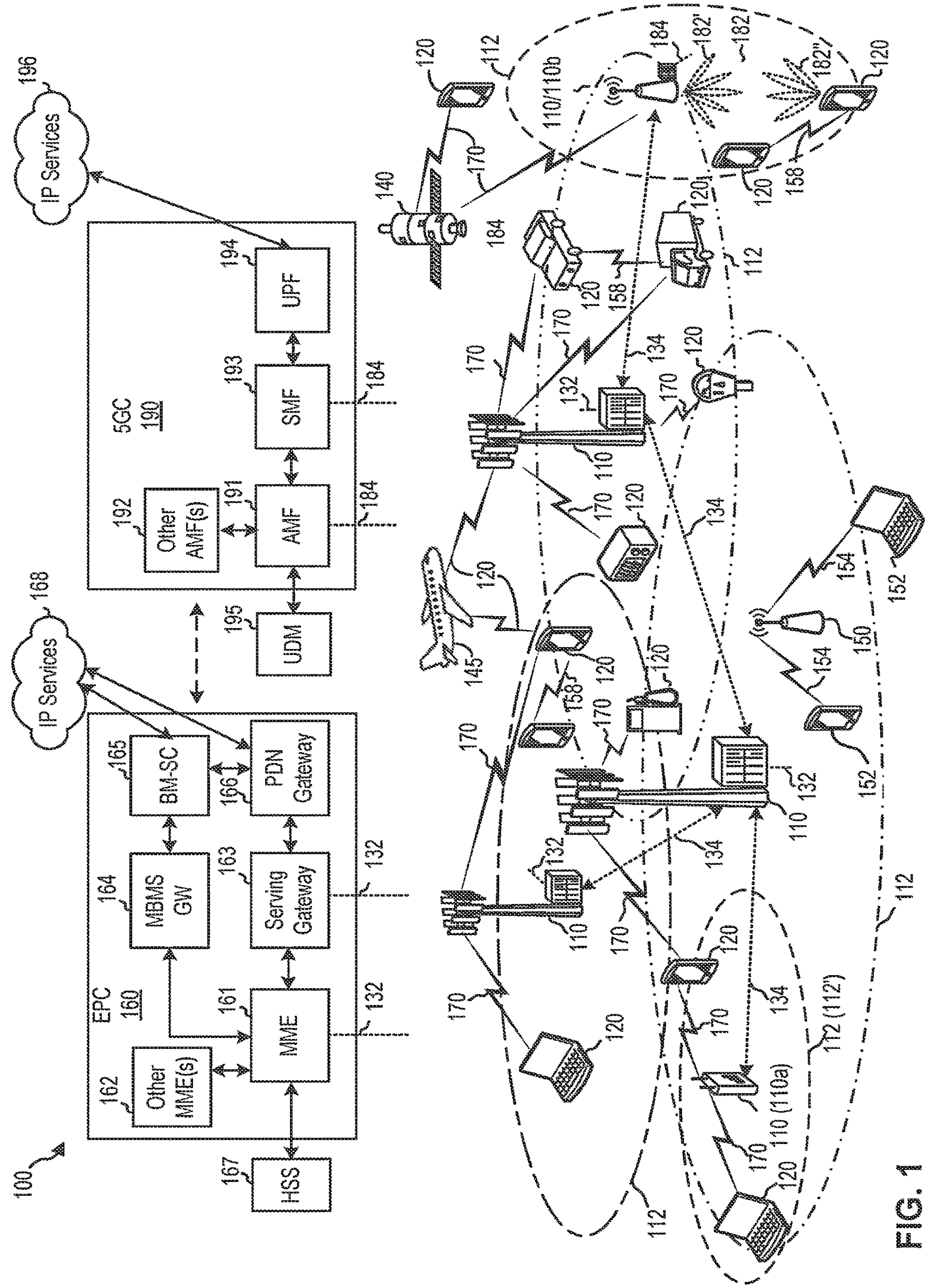
FIG. 1 depicts an example of a wireless communications network, in accordance with the present disclosure.

Aspects of the present disclosure provide apparatuses, methods, processing systems, and computer-readable mediums for L-band frequency domain resource allocation.

A non-terrestrial network (NTN) may provide service coverage to an area where terrestrial service is unreliable or unavailable. In some cases, a UE may communicate with an NTN node over frequencies associated with an L-band. The L-band may have a frequency range that ranges from 1626.5 megahertz (MHz) to 1660.5 MHz (inclusive). In some cases, the UE may be configured with global navigation satellite system (GNSS) location services to assist with uplink frequency and time synchronization for the UE. The GNSS location services may operate in frequencies that are close to the frequencies of the L-band. In some cases, out-of-band and spurious emissions associated with uplink transmissions by the UE within the L-band may result in interference with GNSS signal reception by the UE. GNSS reception interruption caused by the uplink transmissions may deteriorate positioning accuracy and degrade uplink transmission performance by the UE. In some cases, a radio frequency (RF) filter may be implemented at a GNSS receiver and at an L-band NTN transmitter to reduce or eliminate the impact of the uplink out-of-band emissions on the GNSS signal reception. However, the RF filter may be difficult to implement due to the high interference level and the proximity of the frequencies. Including a hardware-based RF filter within an NTN device may be impractical, for example, due to a size of the RF filter and a size of the NTN device. Additionally, or alternatively, the RF filter may interfere with emergency services communication.

Various aspects of the disclosure generally relate to L-band frequency domain resource allocation. In some aspects, a UE may identify interference between an uplink transmission by the UE within the L-band and GNSS signal reception. The UE may transmit information associated with the uplink transmission performed by the UE within the L-band. In one example, the information may include an indication of GNSS signal reception deterioration caused by the uplink transmission within the L-band. In another example, the information may indicate for an NTN node to restrict a frequency domain resource allocation when scheduling uplink transmissions by the UE. The NTN node may adjust the frequency domain resource allocation for uplink transmissions by the UE based at least in part on the information. The UE may receive the adjusted frequency domain resource allocation that includes an adjusted frequency range to be used by the UE for performing the uplink transmissions. In one example, the adjusted frequency range may be a smaller frequency range within the L-band. In another example, the adjusted frequency range may be associated with a higher edge of the L-band frequencies. In another example, the adjusted frequency range may be another frequency range that is outside of the L-band. The UE may perform one or more transmissions in association with the adjusted frequency domain resource allocation.

Particular aspects of the subject matter described in this disclosure can be implemented to realize one or more of the following potential advantages. In some examples, the described techniques can be used to reduce interference between uplink transmissions within an L-band and GNSS signal reception. This may improve uplink transmission performance by the UE in an NTN and/or may improve positioning accuracy associated with GNSS location services. In some examples, the UE may be configured to transmit within a portion of the L-band that is less likely to interfere with the GNSS reception. This may reduce the interference without the UE switching between carriers. In some other examples, the UE may be configured to transmit within another band that is further away from the frequencies associated with the GNSS reception. The UE may switch between carriers while further reducing the likelihood of interference between the L-band transmissions and the GNSS reception.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110*a* may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
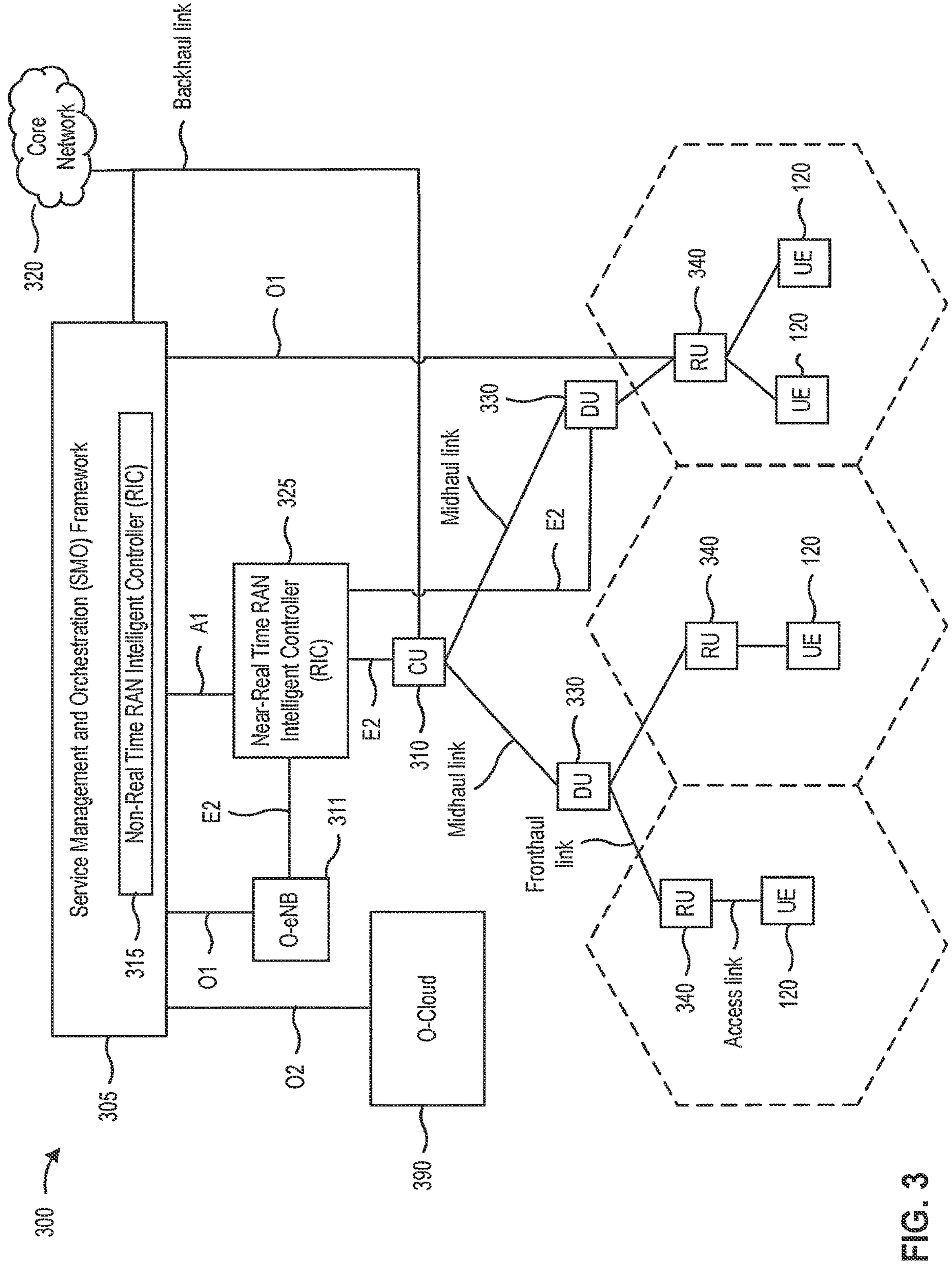
FIG. 3 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110*b*) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHZ, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110*b* in FIG. 1) may utilize beamforming with a UE 120 to improve path loss and range, as shown at 182. For example, BS 110*b* and the UE 120 may each include a plurality of antennas, such as antenna elements, antenna panels, and/or antenna arrays to facilitate the beamforming. In some cases, BS 110*b* may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi access point (AP) 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QOS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
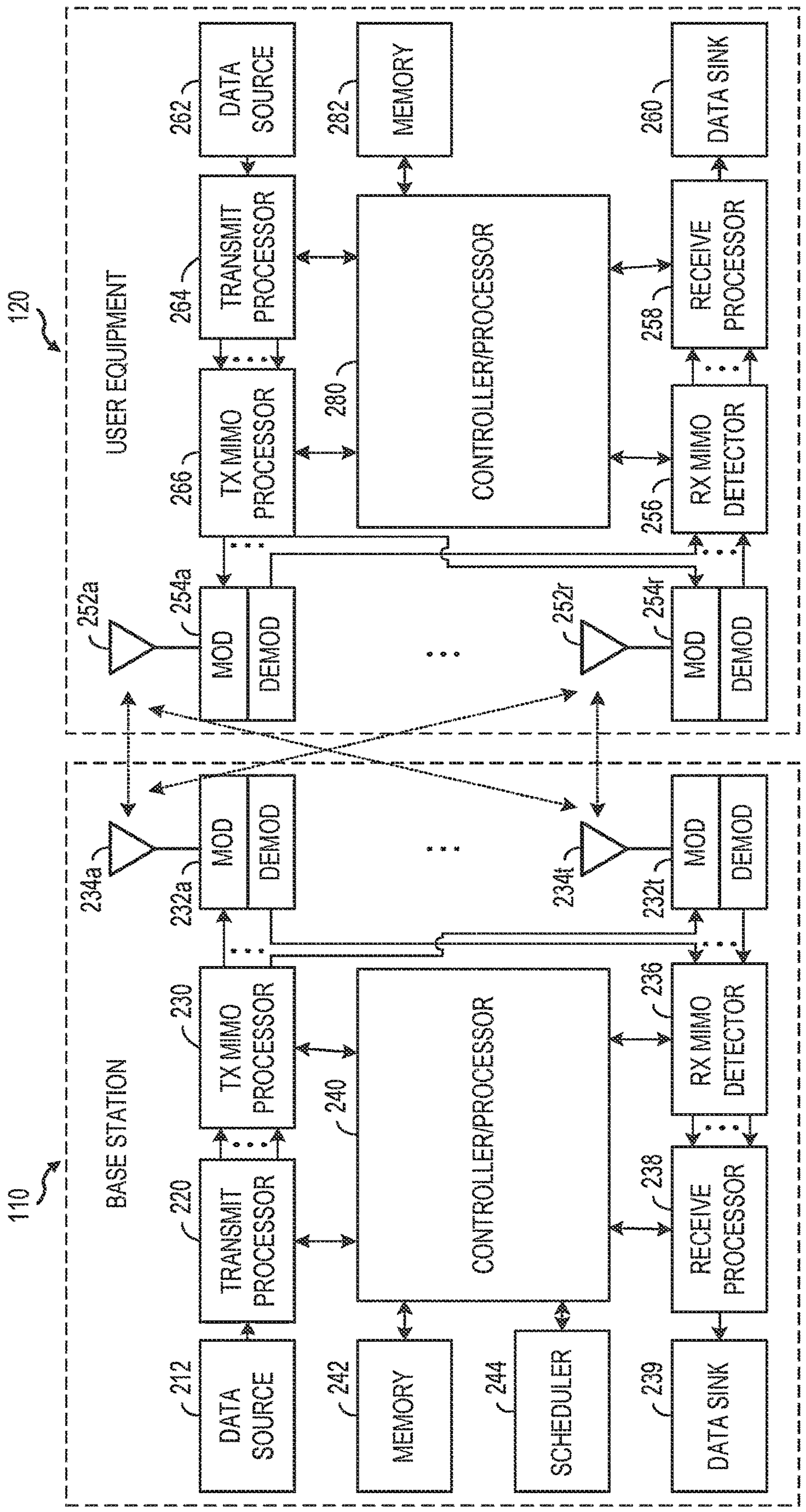
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

UE 120 includes antennas 252*a*-252*r* that may receive the downlink signals from the BS 110 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 110.

At BS 110, the uplink signals from UE 120 may be received by antennas 234*a*-234*t*, processed by the demodulators in transceivers 232*a*-232*t*, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232*a-t*, antenna 234*a-t*, and/or other aspects described herein. Similarly, "receiving" may refer to various mechanisms of obtaining data, such as obtaining data from antennas 234*a-t*, transceivers 232*a-t*, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254*a-t*, antenna 252*a-t*, and/or other aspects described herein. Similarly, "receiving" may refer to various mechanisms of obtaining data, such as obtaining data from antennas 252*a-t*, transceivers 254*a-t*, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (cNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-cNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-cNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figures 4A, 4B, 4C, 4D:
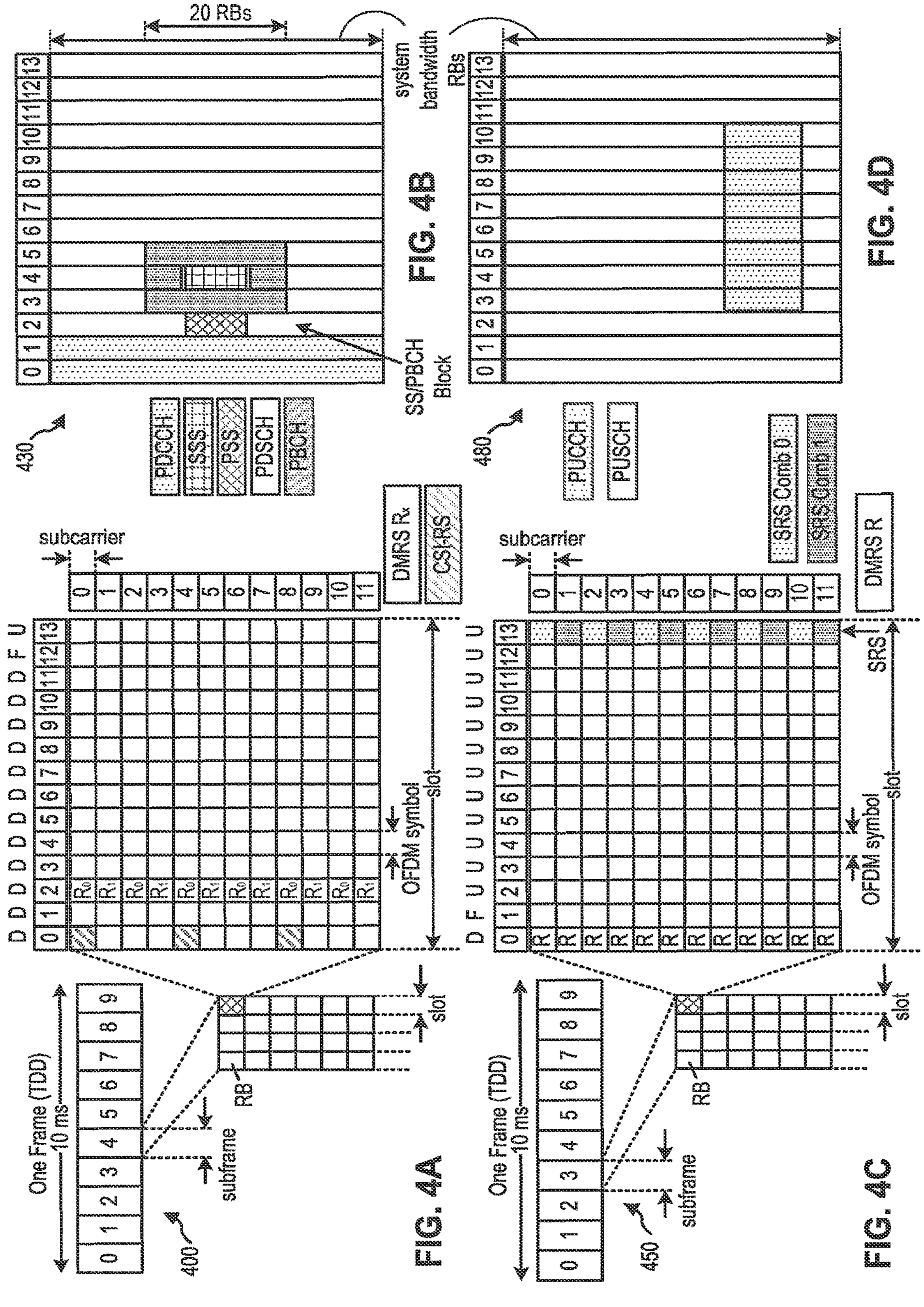
FIGS. 4A, 4B, 4C, and 4D depict aspects of data structures for a wireless communications network, such as wireless communications network of FIG. 1, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 24 slots/subframe. The subcarrier spacing and symbol length/duration are a function of the numerology. The subcarrier spacing may be equal to $2^{\mu}\times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 120) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

As indicated above, FIGS. 4A-4D are provided as examples. Other examples may differ from what is described with regard to FIGS. 4A-4D.

Figure 5:
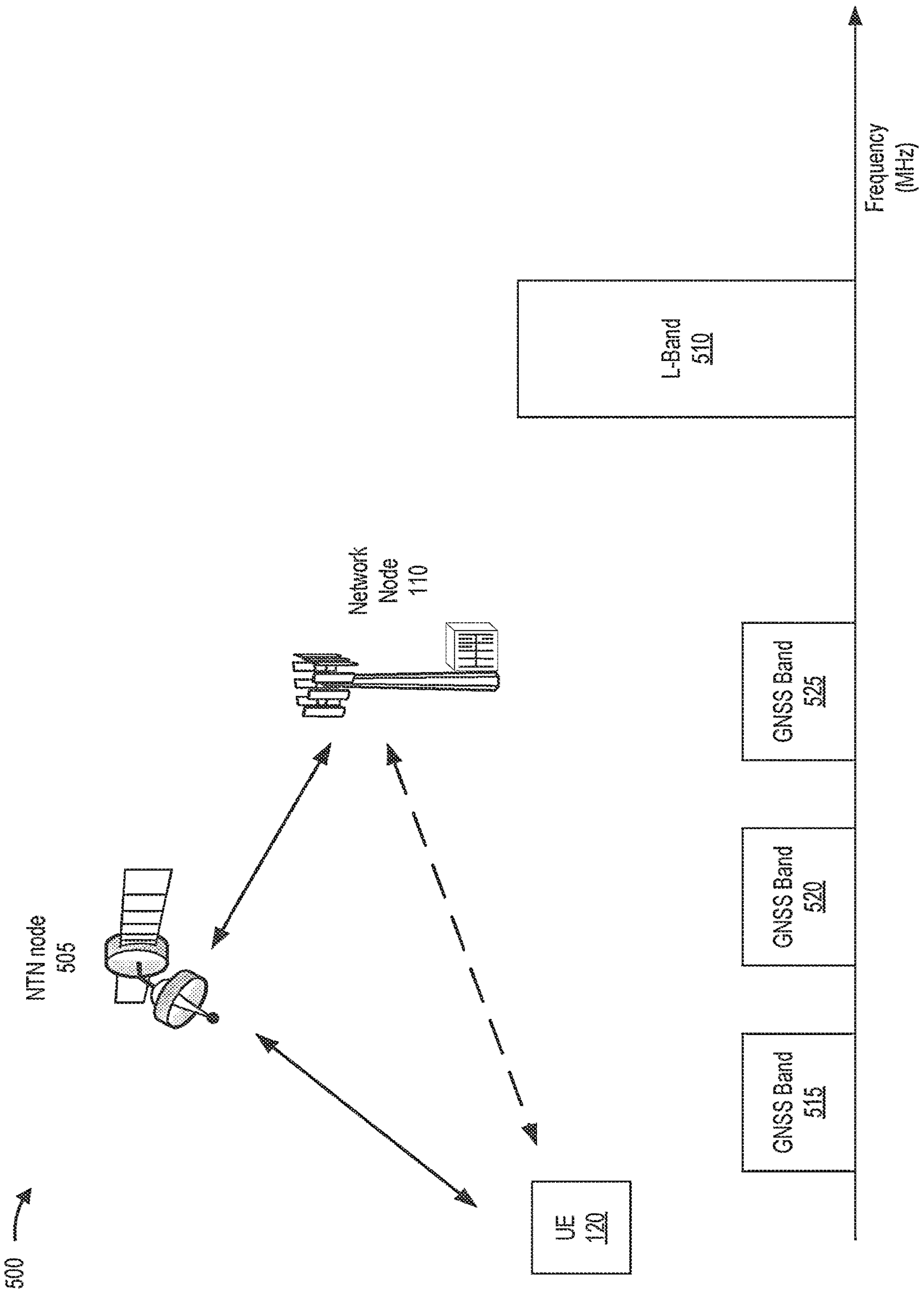
FIG. 5 is a diagram illustrating an example of non-terrestrial network communications, in accordance with the present disclosure.

FIG. 5 is a diagram illustrating an example 500 of non-terrestrial network communications, in accordance with the present disclosure. The UE 120 may communicate with a non-terrestrial network (NTN) node 505 via a first link. The NTN node 505 may be, for example, a satellite, a drone, or a balloon, among other examples. The NTN node 505 may communicate with the network node 110 via a second link. The UE 120 may communicate with the network node 110 via the first link, the NTN node 505, and the second link. For example, the NTN node 505 may relay communications between the UE 120 and the network node 110. Additionally, or alternatively, the UE 120 may communicate directly with the network node 110 via a third link.

An NTN may provide service coverage to an area where terrestrial service is unreliable or unavailable. In some cases, the UE 120 may communicate with the NTN node 505 over frequencies associated with an L-band 510. The L-band 510 may have a frequency range that ranges from 1626.5 MHz to 1660.5 MHZ (inclusive). In some cases, the UE 120 may be configured with global navigation satellite system (GNSS) location services, for example, to assist with uplink frequency and time synchronization for the UE 120. The GNSS location services may operate in frequencies that are close to the frequencies of the L-band 510. For example, the GNSS location services may be performed over frequencies associated with a first GNSS band 515, a second GNSS band 520, or a third GNSS band 525 that are close to the frequencies of the L-band 510.

In one example, the first GNSS band 515 may be a BeiDou B1 band having a frequency range of 1559.1 MHz to 1563.1 MHZ (inclusive), the second GNSS band 520 may be a GPS L1 Galileo E1 band having a frequency range of 1573.4 MHz to 1577.5 MHz (inclusive), and the third GNSS band 525 may be a Glonass G1 band having a frequency range of 1597.5 MHz to 1605.9 MHZ (inclusive). When the UE 120 performs a 20 MHz uplink transmission within the L-band 510 at 25 decibels per milliwatt (dBm), the Glonass G1 band may be located within the frequency range for calculating an adjacent channel leakage ratio (ACLR), for example, ACLR2. The uplink transmission may cause an interference power density of −92 dBm/hertz (Hz) over the Glonass G1 band, which is higher than a desired noise level of −185 dBm/Hz for proper GNSS signal reception.

The out-of-band and spurious emissions associated with uplink transmissions by the UE 120 within the L-band 510 may result in interference with GNSS signal reception by the UE 120. GNSS reception interruption caused by the uplink transmissions may deteriorate positioning accuracy and degrade uplink transmission performance by the UE 120. In some cases, a radio frequency (RF) filter may be implemented at a GNSS receiver and at an L-band NTN transmitter to reduce or eliminate the impact of the uplink out-of-band emissions on the GNSS signal reception. However, the RF filter may be difficult to implement due to the high interference level and the proximity of the frequencies. Including a hardware-based RF filter within an NTN device may be impractical, for example, due to a size of the device and a size of the RF filter. Additionally, or alternatively, the RF filter may interfere with emergency services communications.

Various aspects of the disclosure generally relate to L-band frequency domain resource allocation. In some aspects, a UE may identify interference between an uplink transmission by the UE within the L-band and GNSS signal reception. The UE may transmit information associated with the uplink transmission performed by the UE within the L-band. In one example, the information may include an indication of GNSS signal reception deterioration caused by the uplink transmission within the L-band. In another example, the information may indicate for an NTN node to restrict a frequency domain resource allocation when scheduling uplink transmissions by the UE. The NTN node may adjust the frequency domain resource allocation for uplink transmissions by the UE based at least in part on the information. The UE may receive the adjusted frequency domain resource allocation that includes an adjusted frequency range to be used by the UE for performing the uplink transmissions. In one example, the adjusted frequency range may be a smaller frequency range within the L-band. In another example, the adjusted frequency range may be associated with a higher edge of the L-band frequencies. In another example, the adjusted frequency range may be another frequency range that is not within the L-band. The UE may perform one or more transmissions in association with the adjusted frequency domain resource allocation.

Particular aspects of the subject matter described in this disclosure can be implemented to realize one or more of the following potential advantages. In some examples, the described techniques can be used to reduce interference between uplink transmissions within an L-band and GNSS signal reception. This may improve uplink transmission performance by the UE in an NTN and/or may improve positioning accuracy associated with GNSS location services. In some examples, the UE may be configured to transmit within a portion of the L-band that is less likely to interfere with the GNSS reception. This may reduce the interference without the UE switching between carriers. In some other examples, the UE may be configured to transmit within another band that is further away from the frequencies associated with the GNSS reception. The UE may switch between carriers while further reducing the likelihood of interference between the L-band transmissions and the GNSS reception. Additional benefits and advantages are described herein.

As indicated above, FIG. 5 is provided as an example. Other examples may differ from what is described with regard to FIG. 5.

Figure 6:
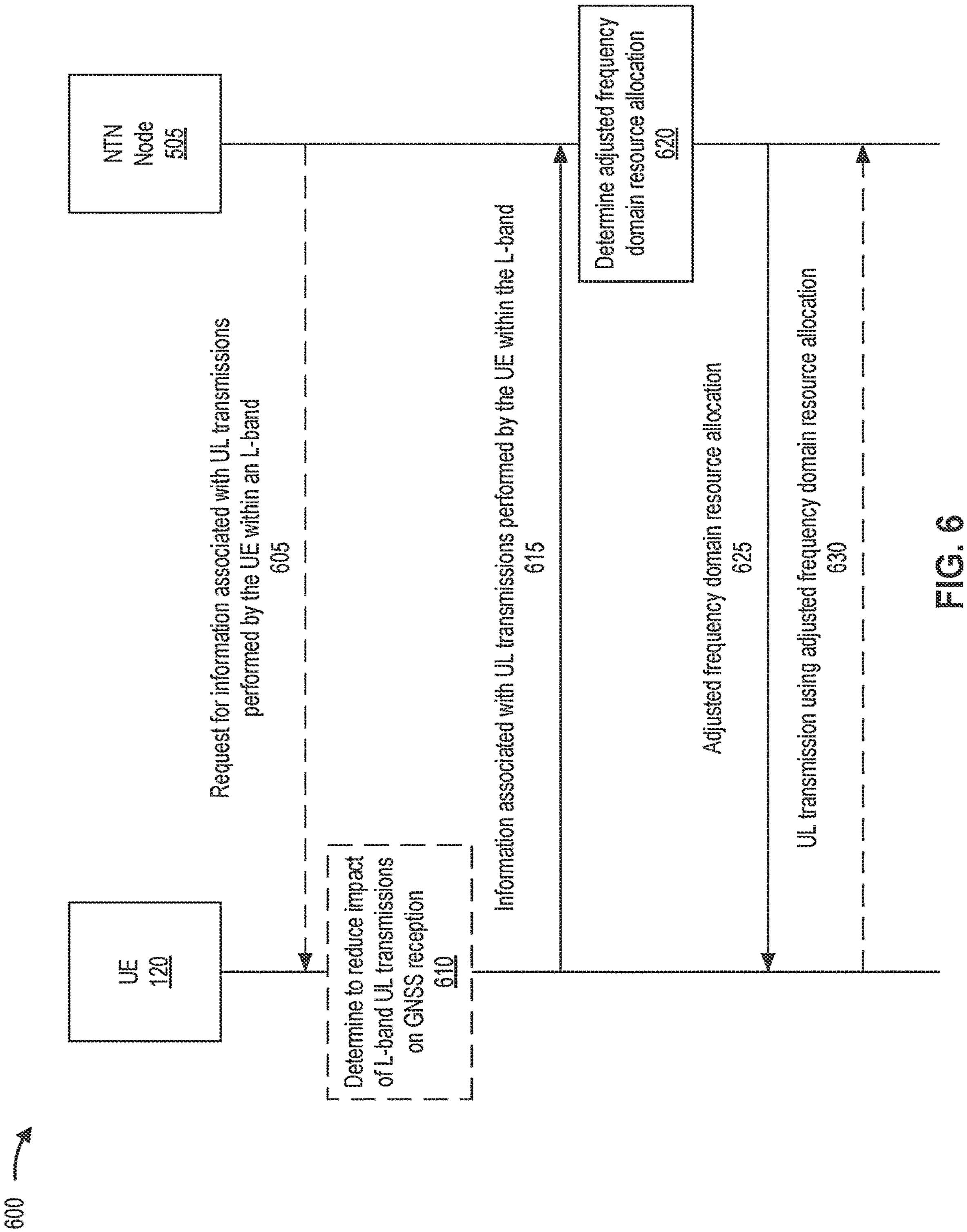
FIG. 6 is a diagram illustrating an example of L-band frequency domain resource allocation, in accordance with the present disclosure.

FIG. 6 is a diagram illustrating an example 600 of L-band frequency domain resource allocation, in accordance with the present disclosure.

As shown by reference number 605, the NTN node 505 may transmit, and the UE 120 may receive, a request for information associated with uplink transmissions performed by the UE 120 within the L-band. For example, the NTN node 505 may transmit, and the UE 120 may receive, a request for information associated with an impact of the uplink transmissions by the UE 120 within the L-band on GNSS reception by the UE 120. The impact of the uplink transmissions within the L-band on GNSS reception may include interference to the GNSS reception that is caused by the uplink transmissions. This may enable the NTN node 505 to determine whether the UE 120 is to transmit the information to the NTN node 505. For example, the NTN node 505 may only indicate for the UE 120 to transmit the information based at least in part on the NTN node 505 scheduling the UE 120 to perform uplink transmissions over a large portion of the L-band frequency resources.

As shown by reference number 610, the UE 120 may determine to reduce the impact of the L-band uplink transmissions on the GNSS reception. In some aspects, the UE 120 may determine to reduce the impact of the L-band uplink transmissions on the GNSS reception based at least in part on detecting interference between the L-band uplink transmissions by the UE 120 and the GNSS reception by the UE 120. In some aspects, the UE 120 may determine to reduce the impact of the L-band uplink transmissions on the GNSS reception based at least in part on receiving the request for the information from the NTN node 505.

As shown by reference number 615, the UE 120 may transmit, and the network node 110 may receive, information associated with uplink transmissions by the UE 120 within the L-band. For example, the UE 120 may transmit, and the network node 110 may receive, a physical layer signal, a MAC control element (MAC-CE), or an RRC message that includes the information. In some aspects, the information may indicate a GNSS signal reception deterioration associated with the uplink transmissions within the L-band. In some other aspects, the information may indicate for the NTN node 505 to restrict a frequency domain resource allocation when scheduling the uplink transmissions by the UE 120.

In some aspects, the information may indicate that the UE 120 does not detect an interference problem between the uplink transmissions by the UE 120 over the L-band and the GNSS reception. For example, the information may indicate that the interference does not deteriorate the GNSS signal to an amount that satisfies a threshold. Additionally, or alternatively, the information may indicate that the UE 120 is able to obtain accurate positioning using the GNSS signal. In this case, the UE 120 may not request an adjusted frequency domain resource allocation.

In some aspects, the UE 120 may determine whether there is any interference between the uplink transmissions within the L-band and the GNSS reception, a type of GNSS (e.g., BeiDou B1, Galileo E1, or Glonass G1) associated with the interference between the uplink transmissions with the L-band and the GNSS signal reception, or an amount of interference between the uplink transmissions with the L-band and the GNSS signal reception. In one example, the UE 120 may calculate the interference based at least in part on a configured uplink frequency resource, an uplink transmit power associated with the UE 120, and/or an implementation or characteristic associated with the UE 120 (for example, a power amplifier (PA) linearity). In another example, the UE 120 may measure the interference while the UE is performing uplink transmissions over the L-band.

In some aspects, the information may include information that can assist the NTN node 505 in deriving a proper resource allocation strategy for the UE 120. In one example, the information may include a recommendation or request for a maximal resource allocation for uplink transmissions by the UE 120 over the L-band. For example, the UE 120 may indicate that the NTN node 505 is only to schedule an uplink resource that is no more than 5 MHZ. In another example, the information may include a recommendation or a request of a lower frequency resource range of the L-band that is not to be allocated for uplink transmissions by the UE 120 within the L-band. For example, the UE 120 may indicate that the frequency range from 1626.5 to 1636.5 MHZ should not be allocated to the UE 120. Thus, the NTN node 505 may only allocate an L-band resource starting from 1636.5 MHz for uplink transmissions by the UE 120. This may increase the gap between the GNSS band and the scheduled uplink transmissions over the L-band. In some aspects, the UE 120 may determine the content of the information based at least in part on the impact of the L-band transmission on the GNSS signal reception. For example, if the UE 120 uses the Glonass L1 band for UE positioning, which may be impacted by large uplink resource allocations (e.g., 20 MHZ) over the L-band, the UE 120 may request an adjusted uplink frequency resource allocation.

In some aspects, the UE 120 may transmit the information based at least in part on the UE 120 relying on the impacted GNSS for positioning. For example, if the UE 120 can perform UE positioning using a GNSS band (other than the GNSS L1 band) that is not impacted by the L-band uplink transmissions, the UE 120 may not transmit the information (e.g., even if the L-band uplink transmission impacts the GNSS L1 band).

As shown by reference number 620, the NTN node 505 may determine an adjusted frequency domain resource allocation for uplink transmissions by the UE 120. In some aspects, the NTN node 505 may determine the adjusted frequency domain resource allocation based at least in part on receiving the information from the UE 120.

In some aspects, the adjusted frequency domain resource allocation may indicate a smaller uplink frequency resource within the L-band to be used by the UE 120 for performing uplink transmissions. In some other aspects, the adjusted frequency domain resource allocation may indicate an uplink frequency resource that is located on a higher frequency edge (e.g., away from the GNSS bands) of the L-band to be used by the UE 120 for performing uplink transmissions. In some other aspects, the adjusted frequency domain resource allocation may indicate a frequency resource that is outside of the L-band to be used by the UE 120 for performing uplink transmissions. For example, the UE 120 and the NTN node 505 may communicate via a different carrier.

In some aspects, the adjusted frequency domain resource allocation may indicate a new resource to be used by the UE 120 for performing the uplink transmissions. In some other aspects, the adjusted frequency domain resource allocation may indicate an adjustment to an existing resource (e.g., in accordance with a configured grant) used by the UE for performing the uplink transmissions.

As shown by reference number 625, the NTN node 505 may transmit, and the UE 120 may receive, the adjusted frequency domain resource allocation. For example, the NTN node 505 may transmit, and the UE 120 may receive, a physical layer signal, a MAC-CE, or an RRC message that includes the adjusted frequency domain resource allocation.

As shown by reference number 630, the UE 120 may transmit, and the NTN node 505 may receive, an uplink transmission using the adjusted frequency domain resource allocation. For example, the UE 120 may perform an uplink transmission using one or more frequency resources associated with the adjusted frequency domain resource allocation. The one or more frequency resources associated with the adjusted frequency domain resource allocation may not interfere with (or may have a reduced amount of interference with) GNSS signal reception by the UE 120.

In some aspects, the NTN node 505 may be configured to manage a relative frequency gap between the frequencies used for GNSS reception and the frequencies used for uplink transmissions within the L-band. Additional details regarding these features are described in connection with FIG. 7.

In some aspects, the UE 120 may determine that uplink transmissions by the UE 120 within the L-band no longer interfere with GNSS reception. For example, the UE 120 may have moved to a different location where the UE 120 is able to obtain an accurate positioning by leveraging a GNSS system that is not impacted by uplink transmissions within the L-band. The UE 120 may transmit, and the NTN node 505 may receive, an indication that the uplink transmissions by the UE 120 within the L-band no longer interfere with GNSS reception. The NTN node 505 and the UE 120 may switch to another frequency domain resource allocation, such as a default frequency domain resource allocation, for uplink transmissions by the UE 120. The other frequency domain resource allocation may include a larger portion of the L-band or may include an entirety of the L-band.

As indicated above, FIG. 6 is provided as an example. Other examples may differ from what is described with regard to FIG. 6.

Figure 7:
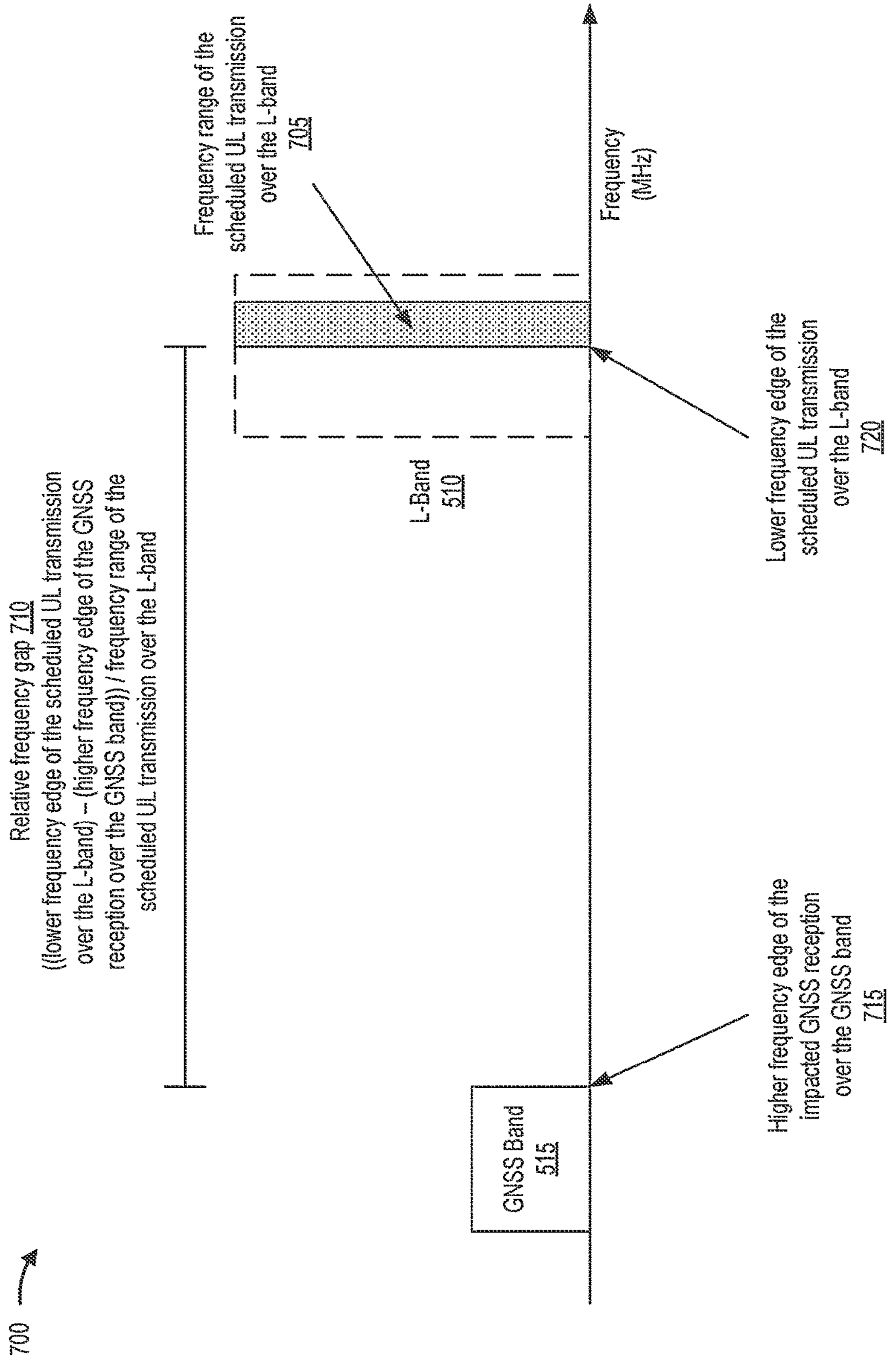
FIG. 7 is a diagram illustrating an example of a relative frequency gap, in accordance with the present disclosure.

FIG. 7 is a diagram illustrating an example 700 of a relative frequency gap, in accordance with the present disclosure. The UE 120 may perform GNSS reception using one or more frequencies within the GNSS band 515. The GNSS band 515 may have a frequency range of 1597.5 MHz to 1605.9 MHZ. For example, the GNSS band 515 may be a Glonass G1 band. The L-band 510 may have a frequency range of 1626.5 MHz to 1660.5 MHz. In some aspects, the UE 120 may perform uplink transmissions using a subset of the frequencies within the L-band 510, as shown by the frequency range of the scheduled uplink transmission over the L-band 705. For example, the frequency range of the scheduled uplink transmission over the L-band 705 may include a frequency range of 1645 MHz to 1655 MHZ. The NTN node 505 may be configured to manage a relative frequency gap 710. The relative frequency gap 710 may be defined as follows: (lower frequency edge of the scheduled uplink transmission over the L-band 720—higher frequency edge of the impacted GNSS reception over the GNSS band 715)/the frequency range of the scheduled uplink transmission over the L-band 705. In one example, the higher frequency edge of the impacted GNSS reception over the GNSS band 715 may be 1605.9 MHZ, the lower frequency edge of the scheduled uplink transmission over the L-band 720 may be 1640 MHZ, and the frequency range of the scheduled uplink transmission over the L-band 705 may be 10 MHZ. In this example, the relative frequency gap 710 may be 3.41. In some aspects, the NTN node 505 may adjust or restrict a scheduling strategy for the uplink transmissions by the UE 120 in order to achieve a larger relative frequency gap 710. For example, if the relative frequency gap 710 is greater than 2, interference from the uplink transmissions within the frequency range of the scheduled uplink transmission over the L-band 705 falls outside of the ACLR/ACLR2 frequency range of the scheduled uplink transmission over the L-band 705. Thus, the interference between uplink transmissions within the frequency range of the scheduled uplink transmission over the L-band 705 and GNSS reception using the GNSS band 515 is reduced and/or mitigated.

As indicated above, FIG. 7 is provided as an example. Other examples may differ from what is described with regard to FIG. 7.

Figure 8:
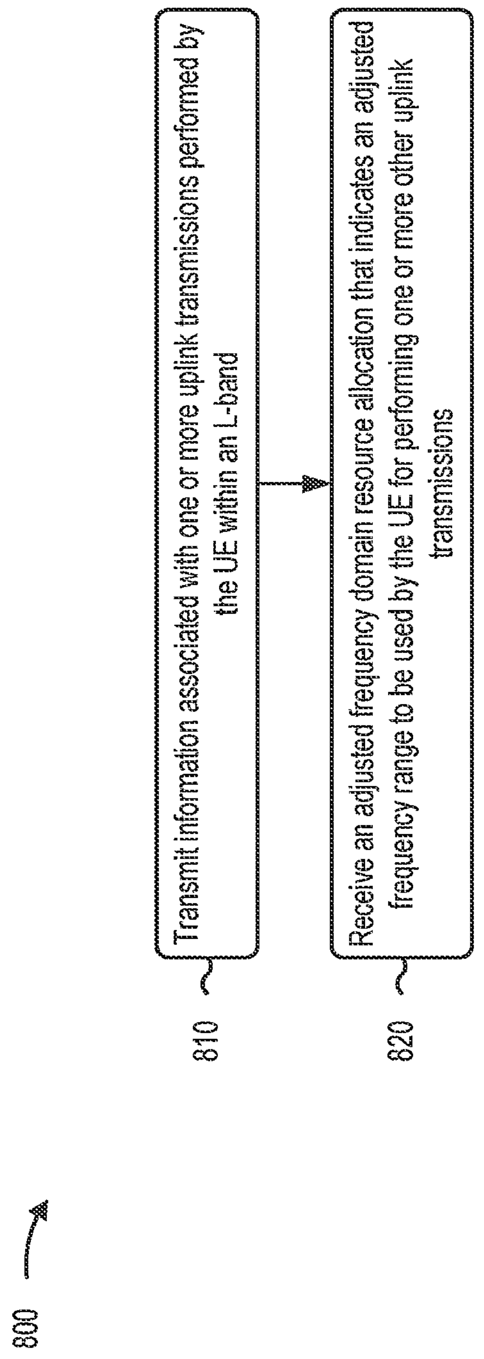
FIG. 8 shows a method for wireless communications by a UE, in accordance with the present disclosure.

FIG. 8 shows a method 800 for wireless communications by a UE, such as UE 120.

Method 800 begins at 810 with transmitting information associated with one or more uplink transmissions performed by the UE within an L-band.

Method 800 then proceeds to step 820 with receiving, after transmitting the information, an adjusted frequency domain resource allocation that indicates an adjusted frequency range to be used by the UE for performing one or more other uplink transmissions.

In one aspect, the L-band is associated with a frequency range that ranges from 1626.5 megahertz to 1660.5 megahertz.

In one aspect, transmitting the information comprises transmitting the information based at least in part on an identified impact of the one or more uplink transmissions within the L-band on the global navigation satellite system (GNSS) reception.

In one aspect, the information includes an indication of an impact on global navigation satellite system (GNSS) reception caused by the one or more uplink transmissions within the L-band.

In one aspect, the information includes an indication to restrict a frequency domain resource allocation based at least in part on scheduling the one or more other uplink transmissions within the L-band.

In one aspect, the adjusted frequency domain resource allocation indicates a reduced frequency range within the L-band to be used by the UE for performing the one or more other uplink transmissions, wherein the reduced frequency range within the L-band includes a subset of frequency resources that are included within the L-band.

In one aspect, the adjusted frequency domain resource allocation indicates one or more uplink frequency resources located on a high frequency edge of the L-band to be used by the UE for performing the one or more other uplink transmissions, wherein the high frequency edge of the L-band includes a subset of frequency resources that are included within the L-band that corresponds to highest frequency values within the L-band.

In one aspect, the adjusted frequency domain resource allocation indicates another frequency band to be used by the UE for performing the one or more other uplink transmissions, wherein the other frequency band has a frequency range that is at least partially outside of the L-band.

In one aspect, the adjusted frequency domain resource allocation indicates a frequency gap between a frequency to be used for performing the one or more other uplink transmissions and a frequency to be used for receiving one or more global navigation satellite system receptions.

In one aspect, method 800 further includes determining that the one or more other uplink transmissions do not interfere with global navigation satellite system reception by the UE.

In one aspect, method 800 further comprises determining a type of global navigation satellite system (GNSS) associated with interference between GNSS reception and the one or more uplink transmissions.

In one aspect, method 800 further includes determining an amount of interference between global navigation satellite system (GNSS) reception and the one or more uplink transmissions; and calculating the amount of interference between the GNSS reception and the one or more uplink transmissions based at least in part on one or more of a configured uplink frequency resource, an uplink transmit power, or one or more UE characteristics.

In one aspect, method 800 further includes determining an amount of interference between global navigation satellite system (GNSS) reception and the one or more uplink transmissions; and calculating the amount of interference between the GNSS reception and the one or more uplink transmissions while the UE is scheduled for the one or more uplink transmissions within the L-band.

In one aspect, method 800 further includes transmitting other information to assist a network node in determining a resource allocation strategy for the adjusted frequency domain resource allocation.

In one aspect, the other information indicates a request for a maximum number of frequency resources that are available within the L-band for the one or more other uplink transmissions.

In one aspect, the other information indicates a portion of frequency resources within the L-band that are not to be allocated for the one or more other uplink transmissions.

In one aspect, method 800 further includes determining the other information based at least in part on an impact of the one or more uplink transmissions within the L-band on global navigation satellite system (GNSS) reception.

In one aspect, method 800 further includes receiving an indication to transmit the information, wherein transmitting the information is based at least in part on receiving the indication to transmit the information.

In one aspect, method 800 further includes determining to use a GNSS for UE positioning, wherein transmitting the information is based at least in part on determining to use the GNSS for UE positioning.

In one aspect, receiving the adjusted frequency domain resource allocation comprises receiving an indication of a resource to be used by the UE for performing the one or more other uplink transmissions within the adjusted frequency range.

In one aspect, method 800 further includes determining that the UE is not to use the adjusted frequency domain resource allocation for additional uplink transmissions; and transmitting other information indicating that the UE is not to use the adjusted frequency domain resource allocation for the additional uplink transmissions.

In one aspect, method 800 further includes using a default frequency domain resource allocation within the L-band for the additional uplink transmissions.

In one aspect, the information is for use by a network node to determine the adjusted frequency domain resource allocation.

Figure 10:
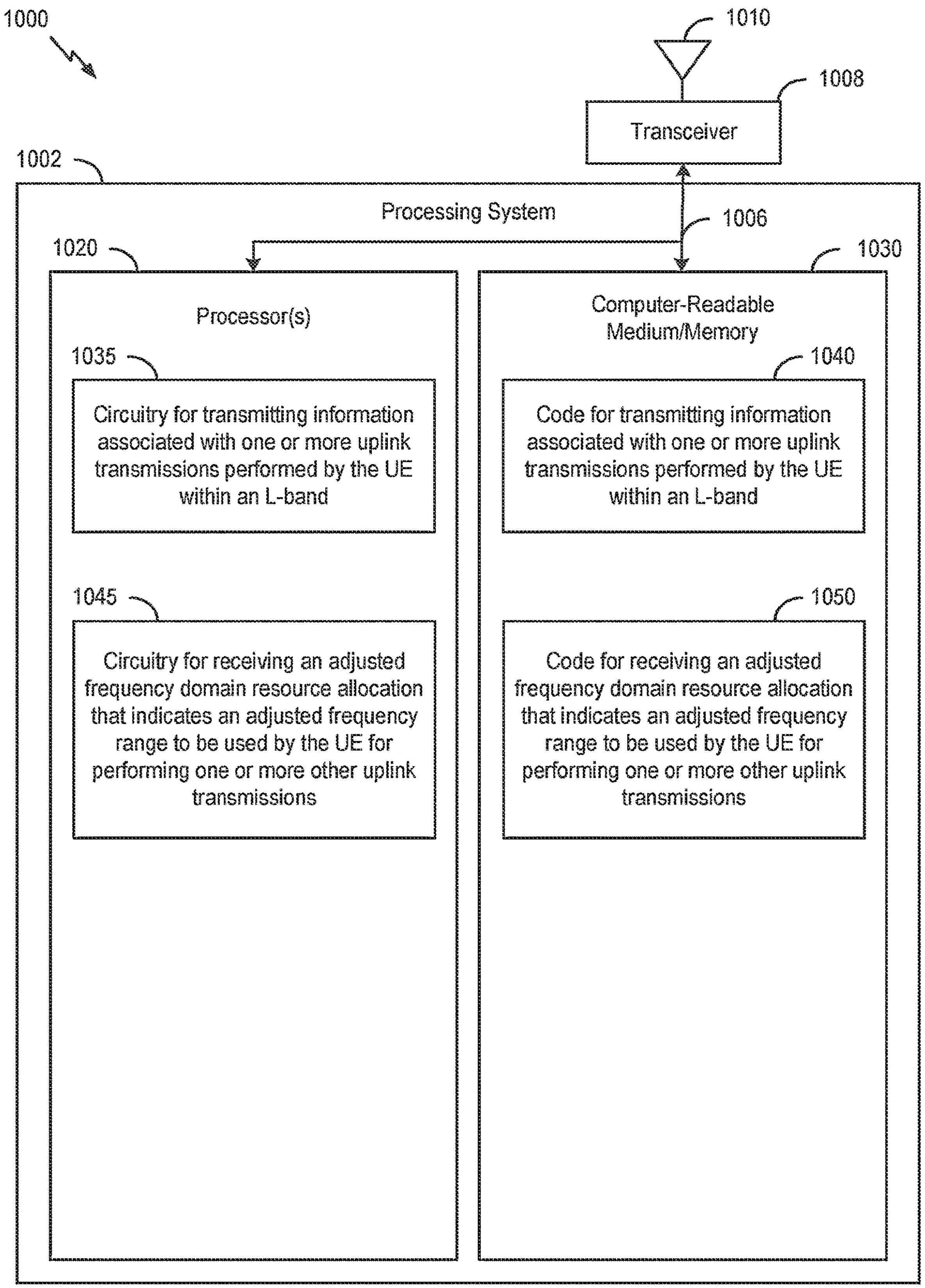
FIG. 10 is a diagram illustrating an example of an implementation of code and circuitry for a communications device, in accordance with the present disclosure.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Figure 9:
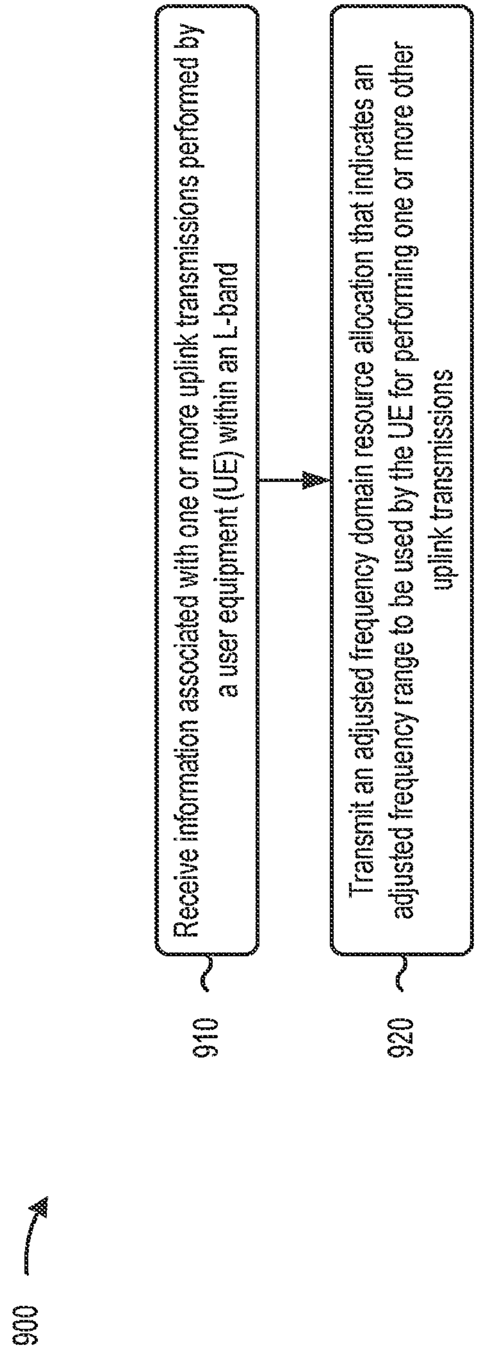
FIG. 9 shows a method for wireless communications by a network node, in accordance with the present disclosure.

FIG. 9 shows a method 900 for wireless communications by a network node, such as BS 110, or a disaggregated base station as discussed with respect to FIG. 3.

Method 900 begins at 910 with receiving information associated with one or more uplink transmissions performed by a UE within an L-band.

Method 900 then proceeds to step 920 with transmitting, after receiving the information, an adjusted frequency domain resource allocation that indicates an adjusted frequency range to be used by the UE for performing one or more other uplink transmissions.

In one aspect, the network node is a non-terrestrial network node.

In one aspect, method 900 further includes determining the adjusted frequency domain resource allocation based at least in part on the information associated with the one or more uplink transmissions by the UE within the L-band.

In one aspect, the L-band is associated with a frequency range that ranges from 1626.5 megahertz to 1660.5 megahertz.

In one aspect, the information includes an indication of an impact on global navigation satellite system (GNSS) reception caused by the one or more uplink transmissions within the L-band.

In one aspect, the information includes an indication to restrict a frequency domain resource allocation based at least in part on scheduling the one or more other uplink transmissions within the L-band.

In one aspect, the adjusted frequency domain resource allocation indicates a reduced frequency range within the L-band to be used by the UE for performing the one or more other uplink transmissions, wherein the reduced frequency range within the L-band includes a subset of frequency resources that are included within the L-band.

In one aspect, the adjusted frequency domain resource allocation indicates one or more uplink frequency resources located on a higher frequency edge of the L-band to be used by the UE for performing the one or more other uplink transmissions, wherein the high frequency edge of the L-band includes a subset of frequency resources that are included within the L-band that corresponds to highest frequency values within the L-band.

In one aspect, the adjusted frequency domain resource allocation indicates another frequency band to be used by the UE for performing the one or more other uplink transmissions, wherein the other frequency band has a frequency range that is at least partially outside of the L-band.

In one aspect, the adjusted frequency domain resource allocation indicates a frequency gap between a frequency to be used for performing the one or more other uplink transmissions and a frequency to be used for receiving one or more global navigation satellite system receptions.

In one aspect, method 900 further includes from the UE to assist the network node in determining a resource allocation strategy for the adjusted frequency domain resource allocation.

In one aspect, the other information indicates a request for a maximum number of frequency resources that are available within the L-band for the one or more other uplink transmissions.

In one aspect, the other information indicates a portion of frequency resources within the L-band that are not to be allocated for the one or more other uplink transmissions.

In one aspect, method 900 further includes transmitting an indication for the UE to transmit the information to the network node.

In one aspect, transmitting the adjusted frequency domain resource allocation comprises transmitting an indication of a resource to be used by the UE for performing the one or more other uplink transmissions within the adjusted frequency range.

In one aspect, method 900 further includes receiving other information indicating that the UE is not to use the adjusted frequency domain resource allocation for additional uplink transmissions.

In one aspect, method 900 further includes using a default frequency domain resource allocation within the L-band for receiving the additional uplink transmissions.

Figure 11:
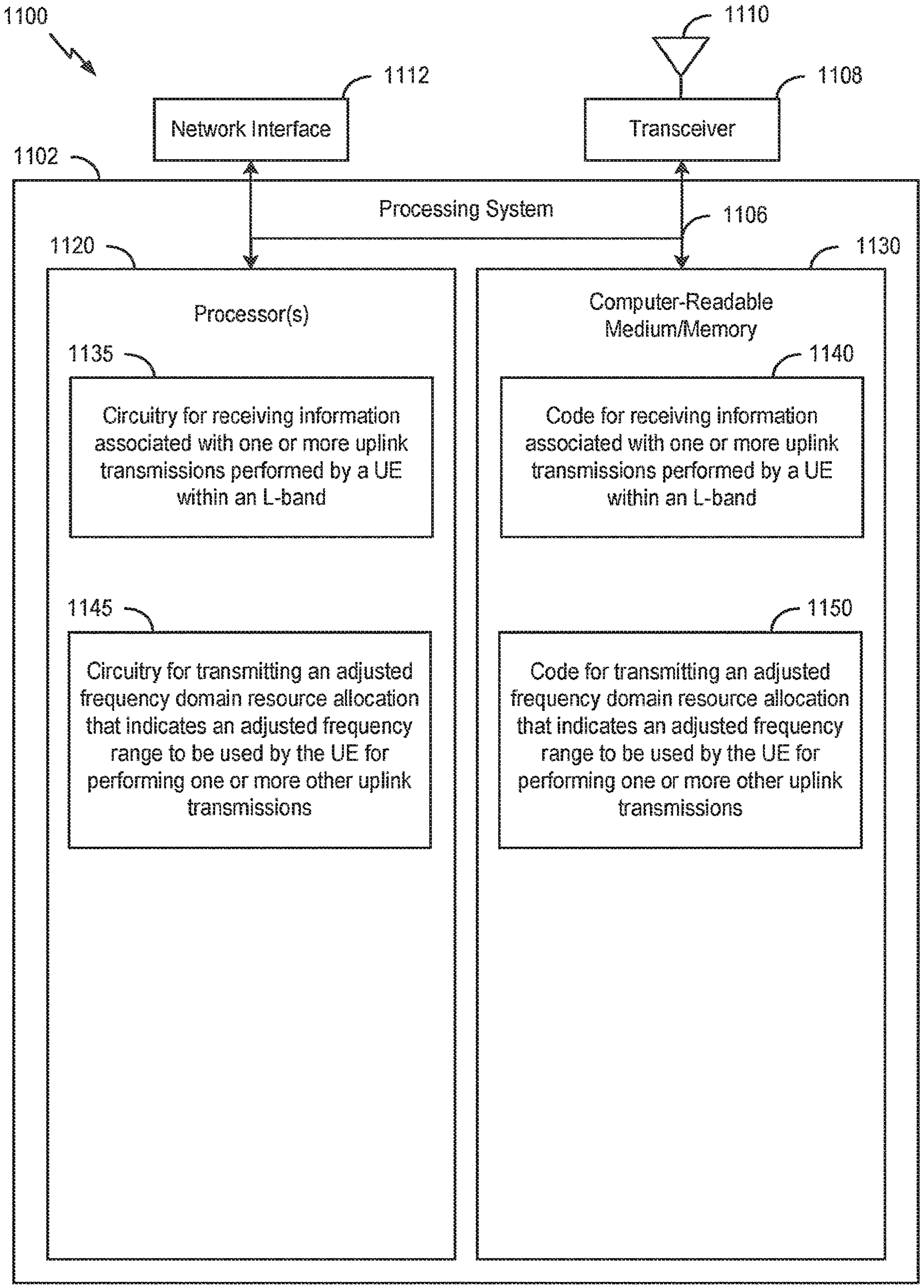
FIG. 11 is a diagram illustrating an example of an implementation of code and circuitry for a communications device, in accordance with the present disclosure.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

FIG. 10 is a diagram illustrating an example of an implementation of code and circuitry for a communications device 1000, in accordance with the present disclosure. The communications device 1000 may be a UE, or a UE may include the communications device 1000.

The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes one or more processors 1020. In various aspects, the one or more processors 1020 may be representative of one or more of receive processor 258, transmit processor 264, TX MIMO processor 266, and/or controller/processor 280, as described with respect to FIG. 2. The one or more processors 1020 are coupled to a computer-readable medium/memory 1030 via a bus 1006. In various aspects, the computer-readable medium/memory 1030 may be representative of memory 282, as described with respect to FIG. 2. In certain aspects, the computer-readable medium/memory 1030 is configured to store instructions (e.g., computer-executable code, processor-executable code) that when executed by the one or more processors 1020, cause the one or more processors 1020 to perform the method 800 described with respect to FIG. 8, or any aspect related to it. Note that reference to a processor performing a function of communications device 1000 may include one or more processors performing that function of communications device 1000.

As shown in FIG. 10, the communications device 1000 may include circuitry for transmitting information associated with one or more uplink transmissions performed by the UE within an L-band (circuitry 1035).

As shown in FIG. 10, the communications device 1000 may include, stored in computer-readable medium/memory 1030, code for transmitting information associated with one or more uplink transmissions performed by the UE within an L-band (code 1040).

As shown in FIG. 10, the communications device 1000 may include circuitry for receiving, after transmitting the information, an adjusted frequency domain resource allocation that indicates an adjusted frequency range to be used by the UE for performing one or more other uplink transmissions (circuitry 1045).

As shown in FIG. 10, the communications device 1000 may include, stored in computer-readable medium/memory 1030, code for receiving, after transmitting the information an adjusted frequency domain resource allocation that indicates an adjusted frequency range to be used by the UE for performing one or more other uplink transmissions (code 1050).

Various components of the communications device 1000 may provide means for performing the method 800 described with respect to FIG. 8, or any aspect related to it. For example, means for transmitting, sending, or outputting for transmission may include the transceiver(s) 254 and/or antenna(s) 252 of the UE 120 and/or transceiver 1008 and antenna 1010 of the communications device 1000 in FIG. 10. Means for receiving or obtaining may include the transceiver(s) 254 and/or antenna(s) 252 of the UE 120 and/or transceiver 1008 and antenna 1010 of the communications device 1000 in FIG. 10.

FIG. 10 is provided as an example. Other examples may differ from what is described in connection with FIG. 10.

FIG. 11 is a diagram illustrating an example of an implementation of code and circuitry for a communications device 1100, in accordance with the present disclosure. The communications device 1100 may be a network node (such as BS 110 or a disaggregated base station as described with regard to FIG. 3), or a network node may include the communications device 1100.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The network interface 1112 is configured to obtain and send signals for the communications device 1100 via communications link(s), such as a backhaul link, midhaul link, and/or fronthaul link as described herein, such as with respect to FIG. 3. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 238, transmit processor 220, TX MIMO processor 230, and/or controller/processor 240, as described with respect to FIG. 2. The one or more processors 1120 are coupled to a computer-readable medium/memory 1130 via a bus 1106. In various aspects, the computer-readable medium/memory 1130 may be representative of memory 242, as described with respect to FIG. 2. In certain aspects, the computer-readable medium/memory 1130 is configured to store instructions (e.g., computer-executable code, processor-executable code) that when executed by the one or more processors 1120, cause the one or more processors 1120 to perform the method 900 described with respect to FIG. 9, or any aspect related to it. Note that reference to a processor performing a function of communications device 1100 may include one or more processors performing that function of communications device 1100.

As shown in FIG. 11, the communications device 1100 may include circuitry for receiving information associated with one or more uplink transmissions performed by a UE within an L-band (circuitry 1135).

As shown in FIG. 11, the communications device 1100 may include, stored in computer-readable medium/memory 1130, code for receiving information associated with one or more uplink transmissions performed by a UE within an L-band (code 1140).

As shown in FIG. 11, the communications device 1100 may include circuitry for transmitting, after receiving the information, an adjusted frequency domain resource allocation that indicates an adjusted frequency range to be used by the UE for performing one or more other uplink transmissions (circuitry 1145).

As shown in FIG. 11, the communications device 1100 may include, stored in computer-readable medium/memory 1130, code for transmitting, after receiving the information, an adjusted frequency domain resource allocation that indicates an adjusted frequency range to be used by the UE for performing one or more other uplink transmissions (code 1150).

Various components of the communications device 1100 may provide means for performing the method 900 described with respect to FIG. 9, or any aspect related to it. For example, means for transmitting, sending, or outputting for transmission may include the transceiver(s) 232 and/or antenna(s) 234 of the BS 110 and/or transceiver 1108 and antenna 1110 of the communications device 1100 in FIG. 11. Means for receiving or obtaining may include the transceiver(s) 232 and/or antenna(s) 234 of the BS 110 and/or transceiver 1108 and antenna 1110 of the communications device 1100 in FIG. 11.

FIG. 11 is provided as an example. Other examples may differ from what is described in connection with FIG. 11.

The following provides an overview of some Aspects of the present disclosure:

Aspect 1: A method of wireless communication performed by a user equipment (UE), comprising: transmitting information associated with one or more uplink transmissions by the UE performed within an L-band; and receiving, after transmitting the information, an adjusted frequency domain resource allocation that indicates an adjusted frequency range to be used by the UE for performing one or more other uplink transmissions.

Aspect 2: The method of Aspect 1, wherein the L-band is associated with a frequency range that ranges from 1626.5 megahertz to 1660.5 megahertz.

Aspect 3: The method of any of Aspects 1-2, wherein transmitting the information comprises transmitting the information based at least in part on an identified impact of the one or more uplink transmissions within the L-band on global navigation satellite system (GNSS) reception.

Aspect 4: The method of any of Aspects 1-3, wherein the information includes an indication of an impact on global navigation satellite system (GNSS) reception caused by the one or more uplink transmissions within the L-band.

Aspect 5: The method of any of Aspects 1-4, wherein the information includes an indication to restrict a frequency domain resource allocation based at least in part on scheduling the one or more other uplink transmissions within the L-band.

Aspect 6: The method of any of Aspects 1-5, wherein the adjusted frequency domain resource allocation indicates a reduced frequency range within the L-band to be used by the UE for performing the one or more other uplink transmissions, wherein the reduced frequency range within the L-band includes a subset of frequency resources that are included within the L-band.

Aspect 7: The method of any of Aspects 1-6, wherein the adjusted frequency domain resource allocation indicates one or more uplink frequency resources located on a high frequency edge of the L-band to be used by the UE for performing the one or more other uplink transmissions, wherein the high frequency edge of the L-band includes a subset of frequency resources that are included within the L-band that corresponds to highest frequency values within the L-band.

Aspect 8: The method of any of Aspects 1-7, wherein the adjusted frequency domain resource allocation indicates another frequency band to be used by the UE for performing the one or more other uplink transmissions, wherein the other frequency band has a frequency range that is at least partially outside of the L-band.

Aspect 9: The method of any of Aspects 1-8, wherein the adjusted frequency domain resource allocation indicates a frequency gap between a frequency to be used for performing the one or more other uplink transmissions and a frequency to be used for receiving one or more global navigation satellite system receptions.

Aspect 10: The method of any of Aspects 1-9, further comprising: determining that the one or more other uplink transmissions do not interfere with global navigation satellite system reception by the UE; and transmitting other information indicating that the one or more other uplink transmissions do not interfere with the global navigation satellite system reception by the UE.

Aspect 11: The method of any of Aspects 1-10, further comprising determining whether interference occurs between global navigation satellite system (GNSS) reception and the one or more uplink transmissions.

Aspect 12: The method of any of Aspects 1-11, further comprising determining a type of global navigation satellite system (GNSS) associated with interference between GNSS reception and the one or more uplink transmissions.

Aspect 13: The method of any of Aspects 1-12, further comprising: determining an amount of interference between global navigation satellite system (GNSS) reception and the one or more uplink transmissions; and calculating the amount of interference between the GNSS reception and the one or more uplink transmissions based at least in part on one or more of a configured uplink frequency resource, an uplink transmit power, or one or more UE characteristics.

Aspect 14: The method of any of Aspects 1-13, further comprising: determining an amount of interference between global navigation satellite system (GNSS) reception and the one or more uplink transmissions; and calculating the amount of interference between the GNSS reception and the one or more uplink transmissions while the UE is scheduled for the one or more uplink transmissions within the L-band.

Aspect 15: The method of any of Aspects 1-14, further comprising transmitting other information to assist a network node in determining a resource allocation strategy for the adjusted frequency domain resource allocation.

Aspect 16: The method of Aspect 15, wherein the other information indicates a request for a maximum number of frequency resources that are available within the L-band for the one or more other uplink transmissions.

Aspect 17: The method of Aspect 15, wherein the other information indicates a portion of frequency resources within the L-band that are not to be allocated for the one or more other uplink transmissions.

Aspect 18: The method of Aspect 15, further comprising determining the other information based at least in part on an impact of the one or more uplink transmissions within the L-band on global navigation satellite system (GNSS) reception.

Aspect 19: The method of any of Aspects 1-18, further comprising receiving an indication to transmit the information, wherein transmitting the information is based at least in part on receiving the indication to transmit the information.

Aspect 20: The method of any of Aspects 1-19, further comprising determining to use a global navigation satellite system (GNSS) for UE positioning, wherein transmitting the information is based at least in part on determining to use the GNSS for UE positioning.

Aspect 21: The method of any of Aspects 1-20, wherein receiving the adjusted frequency domain resource allocation comprises receiving an indication of a resource to be used by the UE for performing the one or more other uplink transmissions within the adjusted frequency range.

Aspect 22: The method of any of Aspects 1-21, further comprising: determining that the UE is not to use the adjusted frequency domain resource allocation for additional uplink transmissions; and transmitting other information indicating that the UE is not to use the adjusted frequency domain resource allocation for the additional uplink transmissions.

Aspect 23: The method of Aspect 22, further comprising using a default frequency domain resource allocation within the L-band for the additional uplink transmissions.

Aspect 24: The method of any of Aspects 1-23, wherein the information is for use by a network node to determine the adjusted frequency domain resource allocation.

Aspect 25: A method of wireless communication performed by a network node, comprising: receiving information associated with one or more uplink transmissions by a user equipment (UE) performed within an L-band; and transmitting, after receiving the information, an adjusted frequency domain resource allocation that indicates an adjusted frequency range to be used by the UE for performing one or more other uplink transmissions.

Aspect 26: The method of Aspect 25, further comprising determining the adjusted frequency domain resource allocation based at least in part on the information associated with the one or more uplink transmissions by the UE within the L-band.

Aspect 27: The method of any of Aspects 25-26, wherein the network node is a non-terrestrial network node.

Aspect 28: The method of any of Aspects 25-27, wherein the L-band is associated with a frequency range that ranges from 1626.5 megahertz to 1660.5 megahertz.

Aspect 29: The method of any of Aspects 25-28, wherein the information includes an indication of an impact on global navigation satellite system (GNSS) reception caused by the one or more uplink transmissions within the L-band.

Aspect 30: The method of any of Aspects 25-29, wherein the information includes an indication to restrict a frequency domain resource allocation based at least in part on scheduling the one or more other uplink transmissions within the L-band.

Aspect 31: The method of any of Aspects 25-30, wherein the adjusted frequency domain resource allocation indicates a reduced frequency range within the L-band to be used by the UE for performing the one or more other uplink transmissions, wherein the reduced frequency range within the L-band includes a subset of frequency resources that are included within the L-band.

Aspect 32: The method of any of Aspects 25-31, wherein the adjusted frequency domain resource allocation indicates one or more uplink frequency resources located on a high frequency edge of the L-band to be used by the UE for performing the one or more other uplink transmissions, wherein the high frequency edge of the L-band includes a subset of frequency resources that are included within the L-band that corresponds to highest frequency values within the L-band.

Aspect 33: The method of any of Aspects 25-32, wherein the adjusted frequency domain resource allocation indicates another frequency band to be used by the UE for performing the one or more other uplink transmissions, wherein the other frequency band has a frequency range that is at least partially outside of the L-band.

Aspect 34: The method of any of Aspects 25-33, wherein the adjusted frequency domain resource allocation indicates a frequency gap between a frequency to be used for performing the one or more other uplink transmissions and a frequency to be used for receiving one or more global navigation satellite system receptions.

Aspect 35: The method of any of Aspects 25-34, further comprising receiving other information from the UE to assist the network node in determining a resource allocation strategy for the adjusted frequency domain resource allocation.

Aspect 36: The method of Aspect 35, wherein the other information indicates a request for a maximum number of frequency resources that are available within the L-band for the one or more other uplink transmissions.

Aspect 37: The method of Aspect 35, wherein the other information indicates a portion of frequency resources within the L-band that are not to be allocated for the one or more other uplink transmissions.

Aspect 38: The method of any of Aspects 25-37, further comprising transmitting an indication for the UE to transmit the information to the network node.

Aspect 39: The method of any of Aspects 25-38, wherein transmitting the adjusted frequency domain resource allocation comprises transmitting an indication of a resource to be used by the UE for performing the one or more other uplink transmissions within the adjusted frequency range.

Aspect 40: The method of any of Aspects 25-39, further comprising receiving other information indicating that the UE is not to use the adjusted frequency domain resource allocation for additional uplink transmissions.

Aspect 41: The method of Aspect 40, further comprising using a default frequency domain resource allocation within the L-band for receiving the additional uplink transmissions.

Aspect 42: An apparatus for wireless communication at a device, comprising a processor; memory coupled with the processor; and instructions stored in the memory and executable by the processor to cause the apparatus to perform the method of one or more of Aspects 1-41.

Aspect 43: A device for wireless communication, comprising a memory and one or more processors coupled to the memory, the one or more processors configured to perform the method of one or more of Aspects 1-41.

Aspect 44: An apparatus for wireless communication, comprising at least one means for performing the method of one or more of Aspects 1-41.

Aspect 45: A non-transitory computer-readable medium storing code for wireless communication, the code comprising instructions executable by a processor to perform the method of one or more of Aspects 1-41.

Aspect 46: A non-transitory computer-readable medium storing a set of instructions for wireless communication, the set of instructions comprising one or more instructions that, when executed by one or more processors of a device, cause the device to perform the method of one or more of Aspects 1-41.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising:
one or more memories; and
one or more processors, coupled to the one or more memories, configured to cause the UE to:
transmit, to at least one of a network node or a non-terrestrial network node and based at least in part on a determination to use a global navigation satellite system (GNSS) for UE positioning, information associated with one or more uplink transmissions previously performed by the UE within an L-band, or to be performed by the UE within the L-band; and
receive, after the information is transmitted, an adjusted frequency domain resource allocation that indicates an adjusted frequency range to be used by the UE for one or more other uplink transmissions.

2. The apparatus of claim 1, wherein the L-band is associated with a frequency range that ranges from 1626.5 megahertz to 1660.5 megahertz.

3. The apparatus of claim 1, wherein the one or more processors are further configured to cause the UE to transmit, based on a determination not to use the GNSS for UE positioning, other information indicating that the UE is not to use the adjusted frequency domain resource allocation.

4. The apparatus of claim 1, wherein the information includes an indication of an impact on global navigation satellite system (GNSS) reception caused by the one or more uplink transmissions within the L-band.

5. The apparatus of claim 1, wherein the adjusted frequency domain resource allocation indicates a reduced frequency range within the L-band to be used by the UE for the one or more other uplink transmissions, wherein the reduced frequency range within the L-band includes a subset of frequency resources that are included within the L-band.

6. The apparatus of claim 1, wherein the adjusted frequency domain resource allocation indicates one or more uplink frequency resources located on a high frequency edge of the L-band to be used by the UE for the one or more other uplink transmissions, wherein the high frequency edge of the L-band includes a subset of frequency resources that are included within the L-band that corresponds to highest frequency values within the L-band.

7. The apparatus of claim 1, wherein the adjusted frequency domain resource allocation indicates another frequency band to be used by the UE for the one or more other uplink transmissions, wherein the other frequency band has a frequency range that is at least partially outside of the L-band.

8. The apparatus of claim 1, wherein the adjusted frequency domain resource allocation indicates a frequency gap between a frequency to be used for the one or more other uplink transmissions and a frequency to be used to receive one or more global navigation satellite system receptions.

9. The apparatus of claim 1, wherein the one or more processors are further configured to cause the UE to:
determine that the one or more other uplink transmissions do not interfere with global navigation satellite system reception by the UE; and
transmit other information indicating that the one or more other uplink transmissions do not interfere with the global navigation satellite system reception by the UE.

10. The apparatus of claim 1, wherein the one or more processors are further configured to cause the UE to determine whether interference occurs between global navigation satellite system (GNSS) reception and the one or more uplink transmissions.

11. The apparatus of claim 1, wherein the one or more processors are further configured to cause the UE to determine a type of global navigation satellite system (GNSS) associated with interference between GNSS reception and the one or more uplink transmissions.

12. The apparatus of claim 1, wherein the one or more processors are further configured to cause the UE to:
determine an amount of interference between global navigation satellite system (GNSS) reception and the one or more uplink transmissions; and
calculate the amount of interference between the GNSS reception and the one or more uplink transmissions based at least in part on one or more of a configured uplink frequency resource, an uplink transmit power, or one or more UE characteristics.

13. The apparatus of claim 1, wherein the one or more processors are further configured to cause the UE to transmit other information to assist a network node determination of a resource allocation strategy for the adjusted frequency domain resource allocation.

14. The apparatus of claim 13, wherein the other information indicates a request for a maximum number of frequency resources that are available within the L-band for the one or more other uplink transmissions.

15. The apparatus of claim 13, wherein the other information indicates a portion of frequency resources within the L-band that are not to be allocated for the one or more other uplink transmissions.

16. The apparatus of claim 1, wherein the one or more processors are further configured to cause the UE to receive an indication to transmit the information, and wherein the one or more processors, to transmit the information, are configured to cause the UE to transmit the information based at least in part on receipt of the indication to transmit the information.

17. The apparatus of claim 1, wherein the one or more processors are further configured to cause the UE to determine to use the GNSS for UE positioning.

18. The apparatus of claim 1, wherein the one or more processors, to receive the adjusted frequency domain resource allocation, are configured to cause the UE to receive an indication of a resource to be used by the UE for the one or more other uplink transmissions within the adjusted frequency range.

19. The apparatus of claim 1, wherein the one or more processors are further configured to cause the UE to:
determine that the UE is not to use the adjusted frequency domain resource allocation for additional uplink transmissions; and
transmit other information indicating that the UE is not to use the adjusted frequency domain resource allocation for the additional uplink transmissions.

20. The apparatus of claim 19, wherein the one or more processors are further configured to cause the UE to use a default frequency domain resource allocation within the L-band for the additional uplink transmissions.

21. The apparatus of claim 1, wherein the one or more processors are further configured to cause the UE to transmit, based on a determination not to use the GNSS for UE positioning, other information indicating that the UE is not to use the adjusted frequency domain resource allocation.

22. An apparatus for wireless communication at a network node, comprising:

one or more memories; and one or more processors, coupled to the one or more memories, configured to cause the network node to:

receive, from a user equipment (UE), information associated with one or more uplink transmissions previously performed by the UE within an L-band, or to be performed by the UE within the L-band, wherein the information indicates whether the UE is able to use a global navigation satellite system (GNSS) signal for positioning; and transmit, based on the information, an adjusted frequency domain resource allocation that indicates an adjusted frequency range to be used by the UE for one or more other uplink transmissions.

23. The apparatus of claim 22, wherein the one or more processors are further configured to cause the network node to determine the adjusted frequency domain resource allocation based at least in part on the information associated with the one or more uplink transmissions by the UE within the L-band.

24. The apparatus of claim 22, wherein the network node is a non-terrestrial network node.

25. The apparatus of claim 22, wherein the L-band is associated with a frequency range that ranges from 1626.5 megahertz to 1660.5 megahertz.

26. The apparatus of claim 22, wherein the information includes an indication of an impact on global navigation satellite system (GNSS) reception caused by the one or more uplink transmissions within the L-band.

27. The apparatus of claim 22, wherein the adjusted frequency domain resource allocation indicates a reduced frequency range within the L-band to be used by the UE for the one or more other uplink transmissions, and wherein the reduced frequency range within the L-band includes a subset of frequency resources that are included within the L-band.

28. The apparatus of claim 22, wherein the adjusted frequency domain resource allocation indicates one or more uplink frequency resources located on a high frequency edge of the L-band to be used by the UE for the one or more other uplink transmissions, and wherein the high frequency edge of the L-band includes a subset of frequency resources that are included within the L-band that corresponds to highest frequency values within the L-band.

29. A method of wireless communication performed by a user equipment (UE), comprising:

transmitting, to at least one of a network node or a non-terrestrial network node and based at least in part on a determination to use a global navigation satellite system (GNSS) for UE positioning, information associated with one or more uplink transmissions performed by the UE within an L-band, or to be performed by the UE within the L-band; and receiving, after transmitting the information, an adjusted frequency domain resource allocation that indicates an adjusted frequency range to be used by the UE for performing one or more other uplink transmissions.

30. A method of wireless communication performed by a network node, comprising:

receiving, from a user equipment (UE), information associated with one or more uplink transmissions performed by the UE within an L-band, or to be performed by the UE within the L-band, wherein the information indicates whether the UE is able to use a global navigation satellite system (GNSS) signal for positioning; and transmitting, based on the information, an adjusted frequency domain resource allocation that indicates an adjusted frequency range to be used by the UE for performing one or more other uplink transmissions.

* * * * *